Patented June 19, 1951

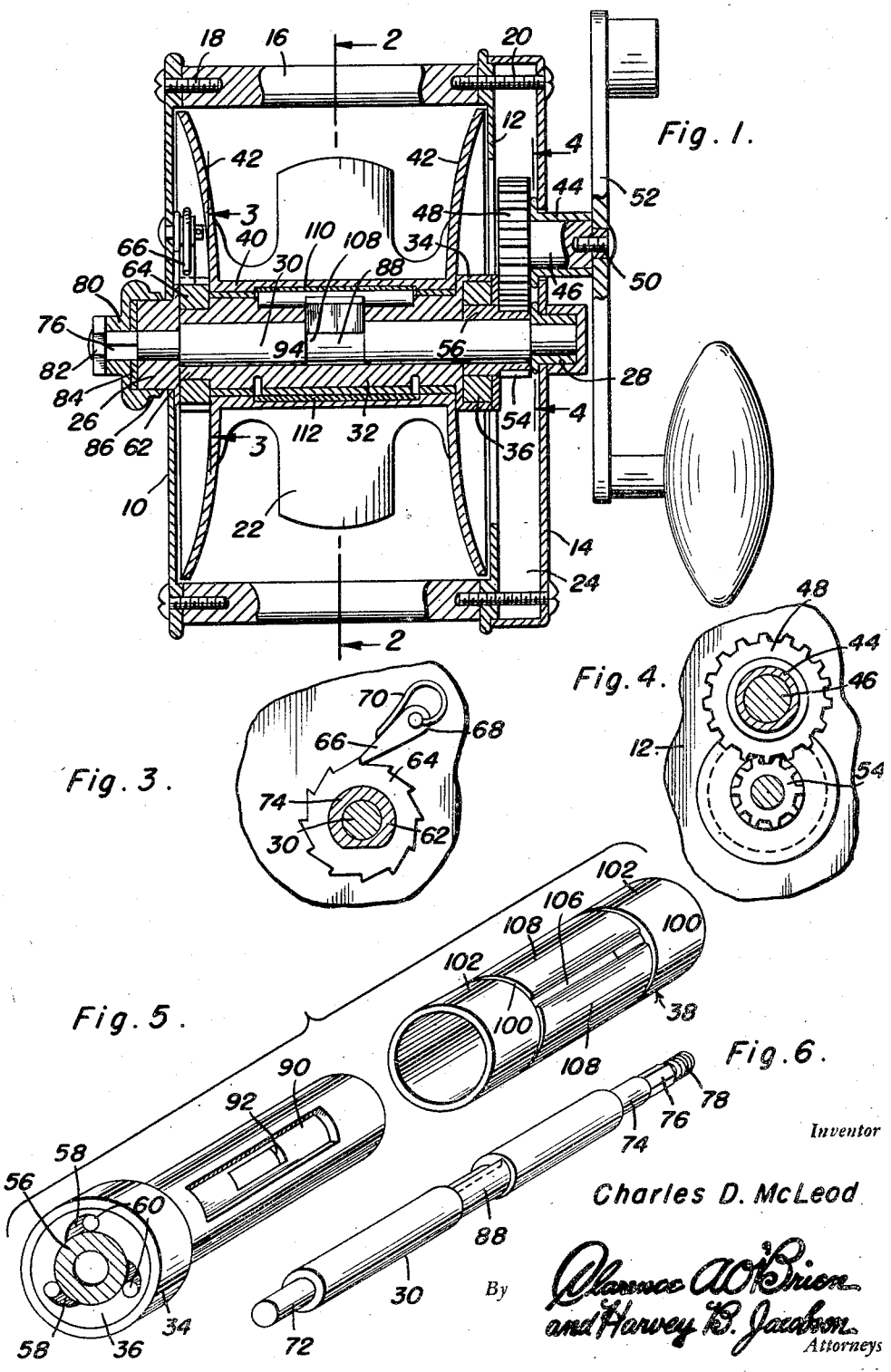

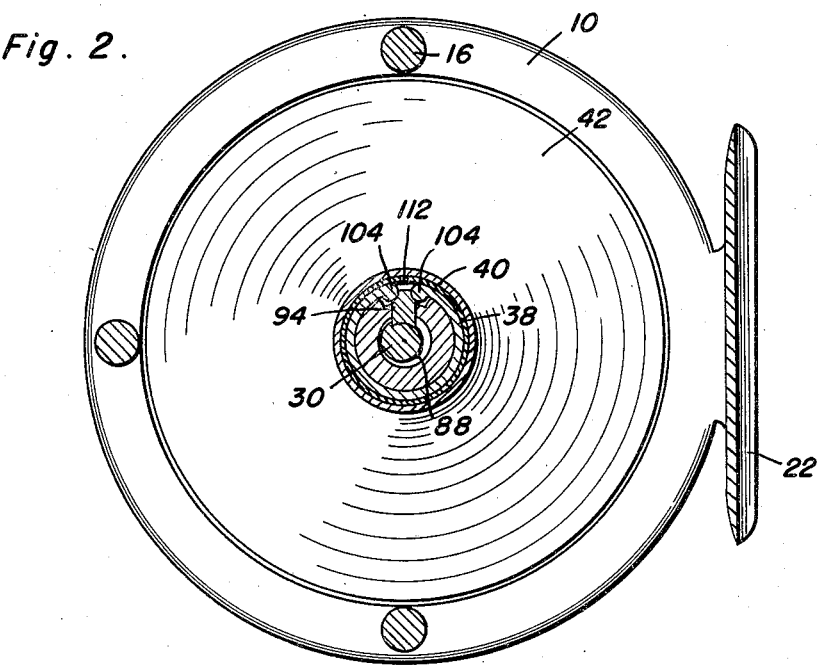
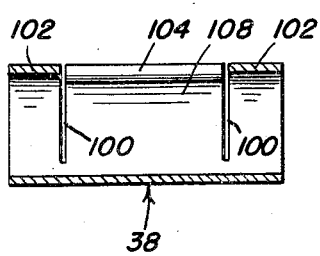
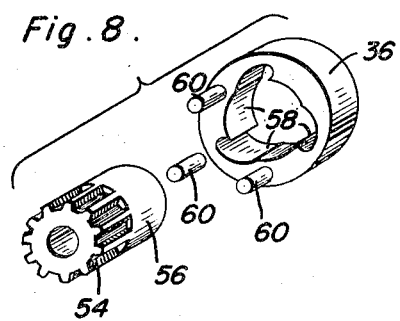
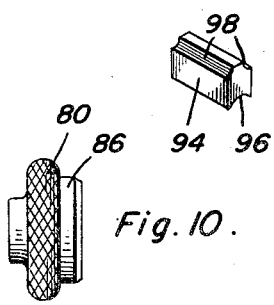
Inventor
Charles D. McLeod

2,557,230

UNITED STATES PATENT OFFICE 2,557,230

FISHING REEL

Charles D. McLeod, St. Petersburg, Fla.

Application December 24, 1948, Serial No. 67,133

5 Claims. (Cl. 242—84.5)

This invention comprises novel and useful improvements in a fishing reel and more specifically pertains to an improved arrangement for imparting a controlled braking action to a fishing reel.

The principal object of this invention is to provide a fishing reel which shall have incorporated therein an improved and easily adjusted braking action for imparting a predetermined resistance to rotation of the reel for paying out the fishing line.

A further object of the invention is to provide a fishing reel wherein there is incorporated an improved one way clutch between the winding handle and the shaft causing rotation of the reel spool.

These, together with various ancillary objects of the invention which will later become apparent as the following description proceeds, are attained by this device, a preferred embodiment of which has been illustrated by way of example only in the accompanying drawings, wherein:

Figure 1 is a vertical longitudinal sectional view through one embodiment of fishing reel embodying the principles of this invention;

Figure 2 is a vertical transverse sectional view taken substantially upon the plane of section line 2—2 of Figure 1;

Figure 3 is a detail view taken in a vertical transverse section substantially upon the plane of section line 3—3 of Figure 1 and illustrating a ratchet mechanism of the device;

Figure 4 is a further detail view in vertical transverse section taken substantially upon the plane of section line 4—4 of Figure 1 and illustrating the reel winding gears of the invention;

Figure 5 is a group assembly perspective view illustrating the construction of certain parts of the operating mechanism of the reel;

Figure 6 is a perspective view of the brake shaft forming a part of the invention;

Figure 7 is a longitudinal vertical sectional view through a brake shoe forming a part of the invention;

Figure 8 is a group assembly perspective view of the elements of the one way clutch of the invention;

Figure 9 is a perspective view of a brake cam wedge; and,

Figure 10 is an elevational view of the brake actuating knob of the invention.

Referring now more specifically to the accompanying drawings, wherein like numerals designate similar parts throughout the various views, attention is directed first to Figures 1 and 2 wherein the reel is shown as comprising a frame consisting of end plates 10 and 12, the latter having a cover plate 14 thereover, spacing members 16 being provided between the plates 10 and 12 and secured thereto and to the cover 14 as by screws or other fastening means 18 and 20. This frame is of substantially conventional design, the same including an appropriately contoured base plate 22 by means of which the reel frame may be mounted upon a fishing rod or the like in accordance with conventional design.

The space between the end plate 12 and the cover plate 14, designated by the numeral 24, serves as a gear housing as set forth hereafter.

Journaled in suitable bearings 26 and 28 in the frame member 10 and cover 14, is a brake control shaft 30, whose construction is shown in Figure 6. Mounted upon the shaft 30 is a tubular shaft 32, which at one end is provided with an annular drum 34 whose inner surface receives and has rigidly secured therein an outer annular clutch member 36, see Figures 5 and 8.

Mounted upon the tubular member 32 is a brake shoe in the form of a sleeve 38, and upon this brake shoe is rotatably mounted the hub portion 40 of a fishing line reel having side flanges 42.

Referring again to Figure 1, it will be seen that the cover 14 is provided with a bearing journal 44 in which is journaled the shaft portion 46 having a reel driving gear 48 thereon. This driving gear is received within the gear compartment 44, while the shaft 46 extends outwardly of the cover 14 has detachably secured thereto as by a fastening screw 50, a reel handle 52 by means of which the reel may be wound.

The reel driving gear 48 is continuously in mesh with a reel driven gear 54, which is integrally attached to a roller 56 constituting the inner or driving race of a one way clutch.

This clutch driving member 56 is thus received within the annular clutch driven member or outer member 36, as indicated in Figures 5 and 8, and it will now be seen that the outer clutch member 36 is provided with a plurality of arcuate slots or recesses 58, which receive clutch pins 60. In a manner well understood in the art, the clutch pins in one direction of rotation will wedge between the driving member 56 and the shallow end of the recesses 58 to establish a locking and driving engagement between the inner and outer clutch members, whereby the tubular shaft 32 will be rotated in unison with the reel crank 52. However, opposite relative rotation of the reel with respect to the crank and its driving mechanism is readily permitted by movement of the clutch pins in the deeper end of the recesses.

At its opposite end, the tubular shaft 32 is provided with a diametrically reduced portion 62 upon which is rigidly mounted a ratchet pinion 64, see Figure 3, which is engaged by a detent or pawl 66 pivoted as at 68 to the frame member 10, and provided with a spring 70 which constantly urges the pawl into engagement with the ratchet wheel 64. The arrangement is such that the tubular shaft 32 and the ratchet wheel 64 are free to rotate in one direction through the agency of the one way clutch member above mentioned, while the tubular shaft 32 is prevented from turning in the opposite direction, the winding lever 52 being free for rotating oppositely.

As will be seen from Figures 1 and 6, the brake shaft 30 has diametrically reduced portions 72 and 74 which constitute bearings for reception in the journal bearings 28 and 26 respectively. The brake shaft 30 however extends beyond the bearing 26, and at its extremity is provided with a shouldered or polygonal shaped extremity 76, terminating in a screw-threaded end 78. Non-rotatably secured upon the shouldered portion 76 is a knurled finger nut 80, retained as by a nut 82 engaging the screw-threaded portion 78. This knurled finger nut 80, receives a packing washer 84 which bears against the end of the bearing 26 to establish a seal therewith. Moreover, the washer 84 may be of felt in order to retain lubricant for this bearing.

The finger grip nut 80 is provided with a sleeve 86 which overlies the bearing 26 for effecting an oil sealing engagement therewith. The finger grip nut 80 constitutes means by which the brake shaft 30 may be rotated in order to adjust the action of the brake. For this purpose, the central portion of the shaft 30 is provided with a reduced cam surface 88. This surface is of spiral configuration with respect to the axis of rotation of the brake shaft 30.

At its mid portion, the tubular shaft 32 is provided with a longitudinally extending slot in the form of a recess in the outer surface of the shaft, as indicated at 90, and intermediate this slot 90 and in alignment with the brake cam 88, the sleeve is provided with a longitudinal aperture 92 which registers with the cam 88 and which is adapted to receive for radial movement therein a brake actuating wedge 94, see Figure 9, which has an arcuate inner surface 96 for establishing a good bearing engagement upon the cam 88, and has concaved surfaces 98 at its outer edges constituting brake shoe actuating surfaces.

A brake shoe in the form of a sleeve 38 above mentioned, is received upon and rigidly secured to the tubular shaft 32. For this purpose the sleeve may conveniently comprise a metallic sleeve of sheet metal or the like, which is provided with longitudinally spaced transverse slots 100 which are disposed intermediate a pair of cylindrical and bearing members 102 which are disposed in journalling engagement with the spool hub 40 and upon the outer surfaces of the tubular shaft 32.

Intermediate the slots 100, the sleeve 38 is longitudinally slit and the edges are rolled over or inturned as at 104 to form longitudinally disposed beads having an opening 106 therebetween. This sleeve 38 is rigidly secured by set screws or the like to the tubular shaft 32 for rotation therewith. The above mentioned cam wedge 94 extends upwardly through the space 106, with its convex surfaces 98 engaging the beads 102 of the sleeve, as shown in Figure 2, upon radial outward movement of the wedge the sleeve will be circumferentially distended, thereby increasing the frictional engagement of the sleeve, and in particular of the lip portions 108 thereof with the inner surface of the reel hub or spool 40, which is annularly recessed as at 110 to provide a brake drum surface therein.

This brake drum surface may be lined with a friction material such as an asbestos brake lining 112, as shown in Figure 2.

From the foregoing, it is felt that the operation of the device will now be readily understood. When the reel handle 52 is rotated in a clockwise direction, the driving gear 48 will cause the driven gear 54 to rotate in a counter-clockwise direction, and this motion, through the driving and driven clutch members 56 and 36 will cause a counter-clockwise rotation of the tubular shaft 32. This counter-clockwise rotation is permitted by the arrangement of the ratchet wheel 64 and detent or pawl 66, the latter however preventing a clockwise rotation of the tubular member. With the finger nut 80 rotated in a clockwise direction, the brake shaft then will be likewise rotated thereby regularly extruding the brake wedge 94 and causing the latter to expand the brake shoe whereby the latter will frictionally grip the brake drum, thereby locking the reel hub 40 to the tubular shaft for rotation by the reel handle 52. In this position of the parts, the reel is now manipulated to wind in the fishing line.

When it is desired to cast the line, or to let the line run out after a strike, the brake shaft 30 through the agency of the finger nut 80 is rotated in a counter-clockwise direction, thereby permitting the spring tension of the lips 108 and of their beads 104, to urge the cam wedge 94 radially inwardly, and permitting the brake shoe to contract and release its frictional engagement with the reel hub. Thereupon, the reel is free to rotate, under such drag or braking action for which the brake shoe is adjusted.

From the foregoing, the construction and operation of the device will be readily understood and further explanation is believed to be unnecessary.

However, since numerous modification and changes will readily occur to those skilled in the art after a consideration of the foregoing specification and accompanying drawings, it is not desired to limit the invention to the exact construction herein described, but all suitable modifications and equivalents may be resorted to, falling within the scope of the appended claims.

Having described the invention, what is claimed as new is:

1. A fishing reel comprising a frame, a brake shaft journaled in said frame, a tubular shaft mounted on said brake shaft, driving means including a one-way clutch connected to one end of said tubular shaft and a ratchet mechanism connected to the other end thereof, a brake sleeve mounted on said tubular shaft, a reel spool rotatably mounted on said brake sleeve, and having a brake drum frictionally engageable by said brake sleeve and means actuated by relative rotation of said brake shaft and tubular shaft for regulating the frictional force of said brake sleeve on said brake drum, said means comprising a cam on said brake shaft, an expansible portion on said sleeve, a cam follower operatively connecting said cam and said expansible portion for causing frictional engagement of said brake drum by said brake sleeve.

2. A fishing reel comprising a frame, a brake shaft journaled in said frame, a tubular shaft mounted on said brake shaft, driving means including a one-way clutch connected to one end of said tubular shaft and a ratchet mechanism connected to the other end thereof, a brake sleeve mounted on said tubular shaft, a reel spool rotatably mounted on said brake sleeve, and having a brake drum frictionally engageable by said brake sleeve and means actuated by relative rotation of said brake shaft and tubular shaft for regulating the frictional force of said brake sleeve on said drum, said means including circumferentially expansible lips on said sleeve engaging said brake drum and a cam on said brake shaft connected to expand said lips.

3. A fishing reel comprising a frame, a brake shaft journaled in said frame, a tubular shaft mounted on said brake shaft, driving means including a one-way clutch connected to one end of said tubular shaft and a ratchet mechanism connected to the other end thereof, a brake sleeve mounted on said tubular shaft, a reel spool rotatably mounted on said brake sleeve, and having a brake drum frictionally engageable by said brake sleeve and means actuated by relative rotation of said brake shaft and tubular shaft for regulating the frictional force of said brake sleeve on said brake drum, said means including circumferentially expansible lips on said sleeve engaging said brake drum, a cam wedge engaging said lips and a cam on said brake shaft for actuating said wedge.

4. A fishing reel comprising a frame, a brake shaft journaled in said frame, a tubular shaft mounted on said brake shaft, driving means including a one-way clutch connected to one end of said tubular shaft and a ratchet mechanism connected to the other end thereof, a brake sleeve mounted on said tubular shaft, a reel spool rotatably mounted on said brake sleeve, and having a brake drum frictionally engageable by said brake sleeve and means actuated by relative rotation of said brake shaft and tubular shaft for regulating the frictional force of said brake sleeve on said brake drum, said means including circumferentially expansible lips on said sleeve engaging said brake drum, a cam wedge engaging said lips and a cam on said brake shaft for actuating said wedge, said tubular shaft having a slot for receiving said wedge for radial sliding movement.

5. A fishing reel comprising a frame, a brake shaft journaled in said frame, a tubular shaft mounted on said brake shaft, driving means including a one-way clutch connected to one end of said tubular shaft and a ratchet mechanism connected to the other end thereof, a brake sleeve mounted on said tubular shaft, a reel spool rotatably mounted on said brake sleeve, and having a brake drum frictionally engageable by said brake sleeve and means actuated by relative rotation of said brake shaft and tubular shaft for regulating the frictional force of said brake sleeve on said brake drum, said means including circumferentially expansible lips on said sleeve engaging said brake drum, a cam wedge engaging said lips and a cam on said brake shaft for actuating said wedge, said tubular shaft having a slot for receiving said wedge for radial sliding movement, said wedge having concave surfaces, said lips having inturned beads seating in said concave surfaces.

CHARLES D. McLEOD.

REFERENCES CITED

The following references are of record in the file of this patent:

UNITED STATES PATENTS

| Number | Name | Date |
| --- | --- | --- |
| 2,162,726 | King | June 20, 1939 |
| 2,257,023 | Ray | Sept. 23, 1941 |
| 2,282,995 | Dumond | May 12, 1942 |